L. Y. CHARD.
LOW PRESSURE SIGNAL FOR AUTOMOBILE TIRES.
APPLICATION FILED APR. 30, 1921.
1,397,619. Patented Nov. 22, 1921.
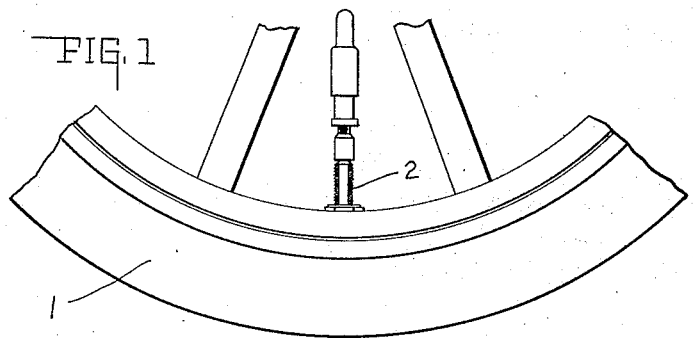
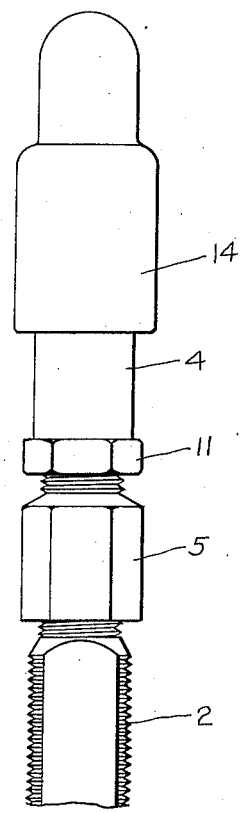
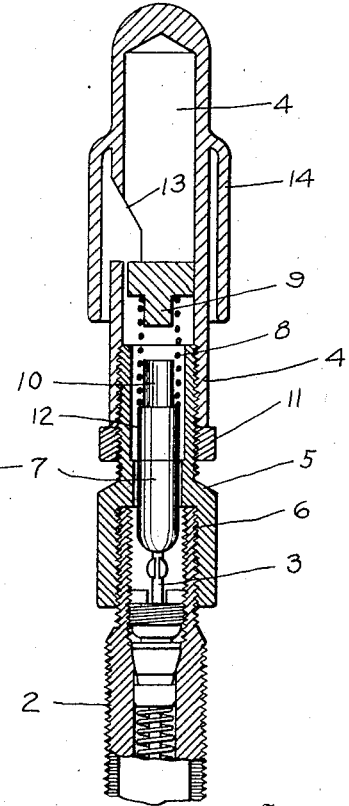
Inventor
LODGE Y. CHARD.
By
Attorney

UNITED STATES PATENT OFFICE.

LODGE YOXON CHARD, OF NEWCASTLE, INDIANA.

LOW-PRESSURE SIGNAL FOR AUTOMOBILE-TIRES.

1,397,619. Specification of Letters Patent. Patented Nov. 22, 1921.

Application filed April 30, 1921. Serial No. 465,880.

*To all whom it may concern:*

Be it known that I, LODGE Y. CHARD, a citizen of the United States, residing at Newcastle, in the county of Henry and State of Indiana, have invented certain new and useful Improvements in Low-Pressure Signals for Automobile-Tires, of which the following is a specification.

This invention relates to low pressure signals for automobile tires and consists of a signaling device, such as a whistle, which is operated by the air pressure within the tire upon the opening of the valve connected with the tire. The prime feature of the invention is the provision of a spring pressed plunger within a casing adapted to rest upon the end of the stem of the usual air valve and forces the valve open when the pressure within the tire has been reduced to a predetermined degree.

A further feature of the invention is the provision of an alarm mechanism in which the plunger is mounted, means being provided for attaching the alarm mechanism to the usual form of valve casing.

A further feature of the invention is the provision of means for regulating the pressure directed against the plunger so that the air will be released for operating the alarm at various determined degrees of low pressure within the tire.

A further feature of the invention is the provision of means for normally excluding foreign particles from the alarm mechanism.
Other objects and advantages will be hereinafter more fully set forth and pointed out in the accompanying specification.

In the accompanying drawings,

Figure 1 is a detail elevation of an automobile tire showing the alarm mechanism attached to the usual form of valve mechanism, Fig. 2 is an enlarged elevation of the alarm mechanism applied to use, Fig. 3 is a vertical central sectional view therethrough, Fig. 4 is a top plan view of the plunger mechanism removed from its casing, and Fig. 5 is a side elevation thereof.

Referring to the drawings, 1 indicates an automobile tire of the inflatable type and 2 indicates the usual form of valve structure through which the air is forced into the tire, said valve structure having the usual form of valve stem 3. As the air frequently escapes from the tires without the knowledge of the occupants of the automobile, frequently causing considerable damage to the tire, an alarm mechanism is provided comprising a whistle 4, the open end of which is threaded for engagement with a housing 5, said housing having threads 6 therein for engagement with the threads of the valve structure 2, and when the whistle and housing are properly mounted upon the end of the valve structure and the valve stem 3 is depressed to permit the air to escape from the tire, the whistle will be sounded and an alarm given to indicate that the tire needs attention.

In order to determine when the pressure within the tire has been reduced to the danger point, a plunger 7 is slidably mounted in the housing 5 and normally rests upon the end of the stem 3, pressure being directed against said plunger by means of a spring 8, one end of the spring surrounding a stud 9 projecting from parts of the whistle 4, and the opposite end thereof surrounding a reduced portion 10 of the plunger. The tension of the spring 8 is such that when the pressure within the tire has been reduced to a predetermined point, say 25 pounds, it will overcome the pressure within the tire and the tension of the spring coöperating with the valve stem, thereby opening the valve and permitting the air to escape rapidly from the tire, consequently such escaping air will cause the whistle to operate and thus notify the occupant of the vehicle that the pressure is low in one of the tires. The tension of the spring 8 may be increased or decreased so that the air will be released from the tire at different degrees of pressure, such result being accomplished by adjusting the whistle portion 4 on the threaded portion of the housing 5, a lock nut 11 being employed for holding the whistle portion 4 in its adjusted position. As an example, should it be desired to have the valve open when an extremely low pressure has been reached within the tire, the whistle portion 4 is turned outwardly on the housing 5 and locked in that position, thereby lessening the tension of the spring 8, and after the whistle portion has been properly adjusted the locking nut 11 is turned against the end thereof thereby holding the whistle portion against further rotation. If it is desired to have the whistle operate while the pressure within the tire is at a greater degree the lock nut 11 is lowered and the whistle portion 4 turned further onto the housing 5, thereby increasing the tension of the spring 8 and causing it to exert a greater pressure against the stem 3.

In order to allow the air to escape past the plunger 7, the periphery of the plunger on diametrically opposite sides is provided with flattened faces 12 which form passages for the air. To prevent dirt, grit and other foreign particles from entering the slot 13 in the whistle, a shield 14 is introduced around the whistle and extends over the slot, said shield being preferably in the shape of a bell and formed integral with the whistle, or attached thereto in any suitable manner. This form of device can be very cheaply manufactured and readily applied to use, as it is but necessary to remove the usual form of dust cap from the valve structure and screw the alarm mechanism thereon which takes the place of the dust cap. It will likewise be seen that the device can be readily adjusted for causing the alarm to be sounded when the pressure within the tire has been reduced to varying degrees, and that when the valve structure is opened the occupant of the vehicle will be instantly notified that the tire needs immediate attention.

Having thus fully described my said invention, what I claim as new and desire to secure by Letters Patent, is:

In a low pressure tire alarm, a plunger adapted to contact with the stem of the tire valve, a spring for the plunger, an internally threaded cap comprising a whistle, said cap engaging the spring to vary its pressure and having an annular flange extending over the whistle opening forming a protective casing to prevent access of dust to said opening, substantially as set forth.

In witness whereof, I have hereunto set my hand and seal at Newcastle, Indiana, this 25th day of April, A. D. nineteen hundred and twenty-one.

LODGE YOXON CHARD. [L. S.]

Witnesses:
    BRUNO LUNDGREEN,
    IVAN SACKMAN.